(12) United States Patent
Skov

(10) Patent No.: US 7,150,625 B2
(45) Date of Patent: Dec. 19, 2006

(54) METHOD AND SYSTEM FOR FORMING A HOLE THROUGH A BLOW MOLDED ARTICLE

(75) Inventor: Erik L. Skov, Akron, OH (US)

(73) Assignee: Rubbermaid Incorporated, Wooster, OH (US)

( * ) Notice: Subject to any disclaimer, the term of this patent is extended or adjusted under 35 U.S.C. 154(b) by 125 days.

(21) Appl. No.: 10/685,257

(22) Filed: Oct. 14, 2003

(65) Prior Publication Data

US 2005/0077645 A1 Apr. 14, 2005

(51) Int. Cl.
*B29C 49/50* (2006.01)

(52) U.S. Cl. ............... 425/527; 425/290; 264/155; 264/163; 264/534

(58) Field of Classification Search ............... 425/527, 425/525, 290; 264/154, 163, 155, 534
See application file for complete search history.

(56) References Cited

U.S. PATENT DOCUMENTS

| | | | | |
|---|---|---|---|---|
| 2,449,133 A | * | 9/1948 | Lyijynen | 425/394 |
| 3,060,509 A | * | 10/1962 | McCubbins, Jr. | 425/577 |
| 3,649,728 A | * | 3/1972 | Honsho et al. | 264/40.5 |
| 4,612,153 A | * | 9/1986 | Mangla | 264/154 |
| 5,204,127 A | * | 4/1993 | Prusha | 425/544 |
| 6,261,504 B1 | * | 7/2001 | Baker et al. | 264/318 |
| 6,814,564 B1 | * | 11/2004 | Baker et al. | 425/394 |
| 2002/0155190 A1 | * | 10/2002 | Romanello | 425/290 |

* cited by examiner

*Primary Examiner*—Robert B. Davis
(74) *Attorney, Agent, or Firm*—Marshall, Gerstein & Borun LLP

(57) ABSTRACT

A blow molding system for forming a hole through a blow molded article includes a mold that houses an outer core pin and a pin support. During the blow molding process, a compression area is created in the mold. After the compression area is formed, the outer core pin and the pin support cooperatively cut out a portion of the compression area during the blow molding process. After the mold is opened, the cut-out portion of the compression area can be removed to expose the hole.

2 Claims, 5 Drawing Sheets

METHOD AND SYSTEM FOR FORMING A HOLE THROUGH A BLOW MOLDED ARTICLE

FIELD OF INVENTION

This disclosure relates generally to forming blow molded articles, and more particularly, to forming a hole through a blow molded article.

BACKGROUND

Blow molding is typically used to manufacture products that have hollow interiors or container products that have storage areas. Such container products include a variety of containers that are used for storage and transport of materials. In a blow molding process, parison is injected or placed in a mold that has an interior cavity with a shape that corresponds to the shape of the blow molded article. The parison is then expanded to the shape of the cavity by having air blown therein.

In certain blow molding processes, the parison fills a narrow area of the mold to create a compression area. A compression area of a blow molded article is typically not hollow and may provide a structural support function for the blow molded article. To create a hole in the compression area that has an axis parallel to the open and close direction of the mold, the mold typically includes a pin that is disposed in the compression area, forming part of the mold during the blow molding process. When the mold is opened, the pin is extracted from the compression area to expose a hole in the space occupied by the pin during the blow molding process.

To create a hole in the compression area of the blow molded article that has an axis oriented transverse to the open and close direction of the mold, the blow molded article is first manufactured by blow molding without forming the hole. The hole is then either drilled or punched out of the compression area after the blow molded article is taken out of the mold.

DETAILED DESCRIPTION

Figure 1:
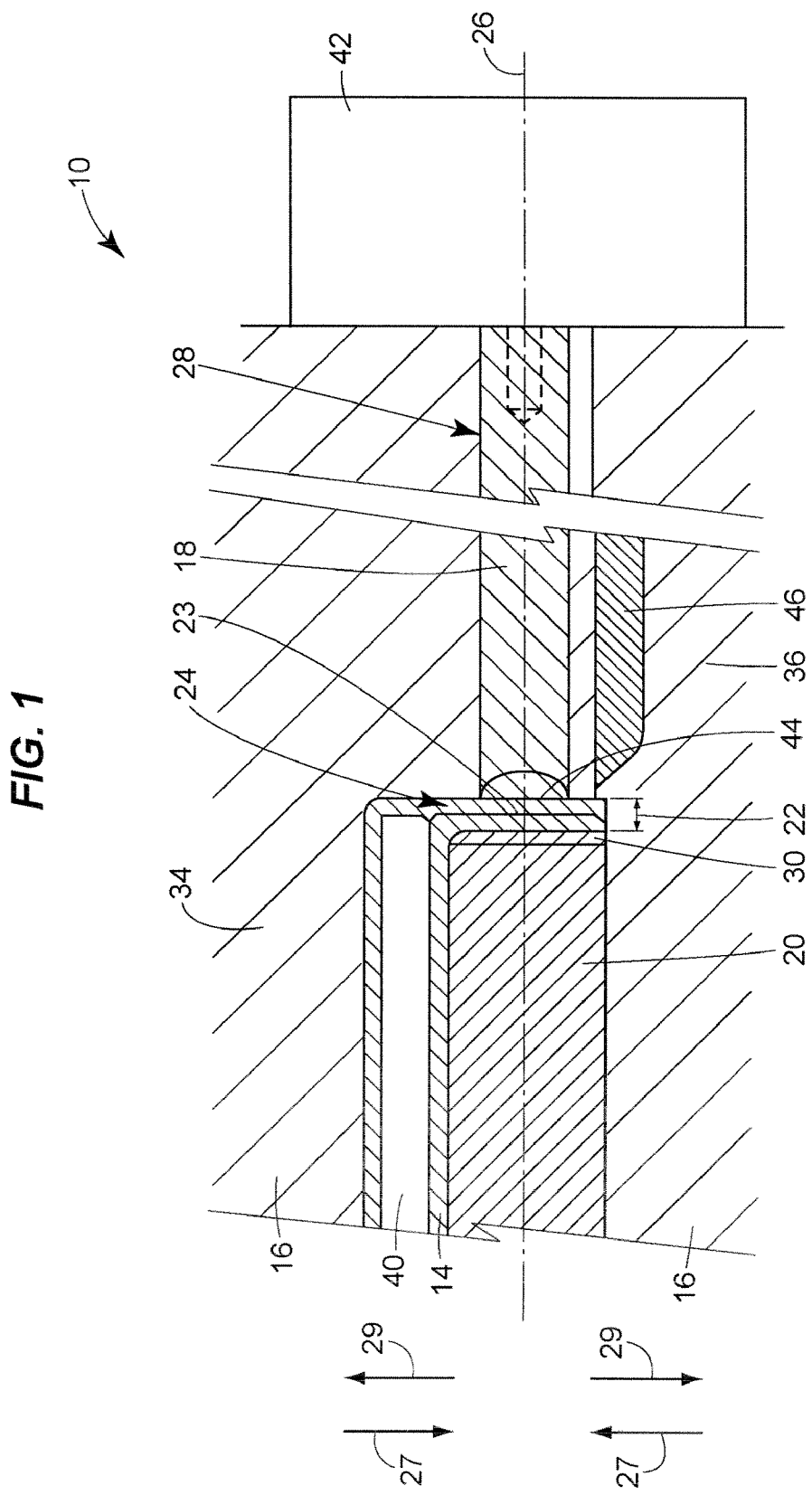
FIG. 1 is a cut-away view of a mold and a blow molding system in accordance with the teachings of a first example of the present disclosure, showing a blow molded article prior to a hole being formed therein.

Referring to FIGS. 1–4, a blow molding system 10 employing the disclosed method of forming a hole 12 through a blow molded article 14 is generally shown. The disclosed system 10 and method can form the hole 12 while the blow molded article 14 is still in the mold 16. Additionally, the hole 12 can be formed by the disclosed system 10 and method such that the hole 12 is oriented generally transverse to an open and closed direction of the mold 16.

The mold 16 houses an outer core pin 18 and a pin support 20. During the blow molding process, a compression area 24 is created in a narrow part of the mold 16 that is defined by a gap 22. After the compression area 24 of the blow molded article 14 is formed in the gap 22, the outer core pin 18 moves from an initial position inside an outer bore 28 along a pin axis 26 towards the pin support 20 to cut out a portion 23 of the compression area 24. The outer core pin 18 subsequently returns to the initial position. After the mold 16 is opened, the cut-out portion 23 of the compression area 24 can be removed to expose the hole 12.

In a first disclosed example, the pin support 20 is a stationary plate 30, upon which the outer core pin 18 strikes to cut out the portion 23 of the compression area 24. In a second disclosed example, the pin support 20 includes an inner core pin 32 that simultaneously and synchronously moves with the outer core pin 18 to cut out the portion 23 of the compression area 24. Both disclosed examples of the blow molding system 10 and method create the hole 12 in the compression area 24 of a blow molded article. The hole 12 is generally oriented transverse to an opening direction 29 and closing direction 27 of the mold 16. Prior techniques for forming this type of hole are performed as a subsequent processing step after removal of the molded part from the mold.

The steps of forming blow molded articles with one or more compression areas are well known to those of ordinary skill in the art. Such steps as applied to the blow molding system 10 generally include initially closing the mold 16 by bringing two mold halves 34 and 36 together to form an internal cavity 40. Parison (not shown) is injected or placed inside the cavity 40. Air is then blown inside the parison, which causes expansion of the parison in the internal cavity 40. The parison fully expands in the internal cavity 40 and conforms to the shape of the internal cavity 40 to form the blow molded article 14. Any excess material from the parison spills into a flash area 46. The mold 16 is then opened and the blow molded article 14 is removed from the mold 16. The excess material that may have been collected in the flash area 46 is removed from the blow molded article 16.

In blow molding processes that are well known to those of ordinary skill in the art, such as the one just described, a compression area can be formed in a narrow space bound by portions of the mold. Accordingly, unlike the hollow portions of a blow molded article, a compression area may not be hollow. One of ordinary skill in the art will readily appreciate that compression areas of blow molded articles may provide various functions that require strength, stiffness, rigidity, or other properties that a hollow portion of a blow molded article may not provide. For instance, a blow molded container can include one or more handles that are formed by compression areas. Such handles can support the weight of the container in addition to the weight of various materials that may be placed inside the container.

Referring to FIGS. 1–4, parts of the blow molding system 10 that are common to both the first and second disclosed examples will now be described. In FIGS. 1–4, only the part of the mold 16 where the compression area 24 forms during a blow molding process is shown. The mold 16 generally includes a first mold half 34 and a second mold half 36 that come together in the closing direction 27 to close the mold 16 and are pulled apart in the opening direction 29 to open the mold 16. When the mold 16 is closed, the internal cavity 40 forms inside the mold and defines the shape of the blow molded article 14.

The outer bore 28 is located inside the mold 16 and may be a part of the first mold half 34, the second mold half 36, or an independent structure that is disposed between the first mold half 34 and the second mold half 36. One of ordinary skill in the art will readily appreciate that the position of the outer bore 28 inside the mold 16 may be dictated by numerous factors, such as the shape of the blow molded article 14, and the open and close configuration of the mold 16. The outer core pin 18 slides in the outer bore 28 along the pin axis 26, which is a common axis to both the outer core pin 18 and the outer bore 28. The pin axis 26 is generally transverse to the open and close directions 29 and 27, respectively, of the mold 16. The orientation of directions 27 and 29 relative to the pin axis 26, as described herein and shown in FIGS. 1–4, is exemplary and only illustrates the generally transverse orientation of the pin axis 26 relative to an open and close direction of the mold 16. One of the ordinary skill in the art will appreciate, however, that the pin axis 26 can be oriented relative to directions 27 and 29 in any desired manner. In the disclosed example, the pin axis 26 is shown to be perpendicular to the directions 27 and 29.

The outer bore 28 extends from the compression area 24 to a side of the mold 16. One of ordinary skill in the art will appreciate that the outer core pin 18 can be actuated from inside or outside the mold 16 to provide a reciprocating movement thereof inside the outer bore 28. In the disclosed examples, however, the outer bore 28 is open to outside the mold 16 to provide access to an outer core pin actuator 42 positioned outside the mold 16. The outer core pin actuator 42 provides a reciprocating actuation of the outer core pin 18 in the outer bore 28, which is simply the movement of the outer core pin 18 from the initial position toward the pin support 20 and the return of the outer core pin 18 to the initial position. The outer core pin actuator 42 can be any type of actuator that is well known to those of ordinary skill in the art. In the disclosed example, however, the outer core pin actuator 42 includes a hydraulic or pneumatic cylinder (not shown) that is connected to the outer core pin 18. Accordingly, a reciprocating movement of the hydraulic or pneumatic cylinder (not shown) is transferred to the outer core pin 18.

Figure 2:
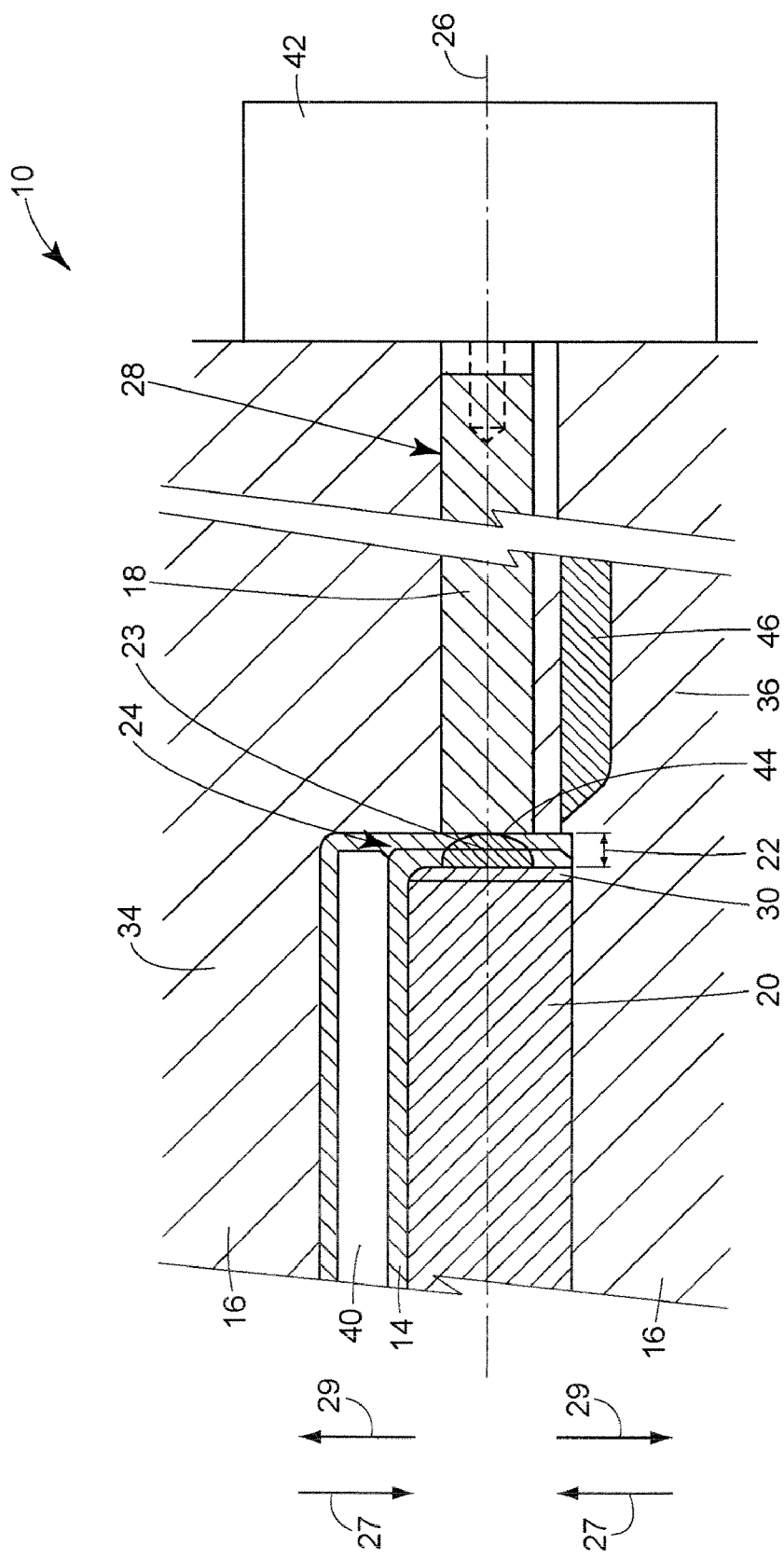
FIG. 2 is the cut-away view of the mold and the blow molding system of FIG. 1, showing the blow molded article after the hole has been formed therein.

Referring to FIGS. 1 and 2, the first example of the blow molding system 10 and method will now be described. In the first example, the pin support 20 includes the stationary plate 30, upon which the outer core pin 18 strikes to cut out a portion of the compression area 24. The stationary plate 30 is located inside the mold 16 and may be a part of the first mold half 34, the second mold half 36, or an independent structure that is disposed between the first mold half 34 and the second mold half 36. As shown in FIGS. 1 and 2, the stationary plate 30 may simply be an end face of the pin support 20. The stationary plate 30 is generally oriented perpendicular to the pin axis 26. Accordingly, the outer core pin 18 moves relative to the stationary plate 30 in a generally perpendicular orientation.

The stationary plate 30 partially forms a boundary of the gap 22, in which the compression area 24 is formed. The outer core pin 18 includes an end face 44 that also partially forms a boundary of the gap 22 on the opposite side of the stationary plate 30. Accordingly, after the compression area 24 is formed during the blow molding process, the stationary plate 30 and the end face 44 of the outer core pin 18 bear against the opposite sides of the portion 23 of the compression area 24. To cut out the portion 23 of the compression area 24 when the outer core pin 18 moves towards the stationary plate 30, the rim or the perimeter of the pin end face 44 is sharp. When cutting through the compression area 24, the pin end face 44 displaces the cut-out portion 23 and partially occupies the space in the compression area 24 that was filled by the cut-out portion 23. To provide a space between the end face 44 and the stationary plate 30 for the cut-out portion 23, the end face 44 is concave. Accordingly, the cut-out portion 23 occupies the concave space of the pin end face 44 when cut out of the compression area 24.

In the first disclosed example, after the compression area 24 is formed in the mold 16, the outer core pin actuator 42 moves the outer core pin 18 from an initial position toward the stationary plate 30, during which the perimeter of the pin end face 44 cuts through the compression area 24. As shown in FIG. 1, the outer core pin 18 is at the initial position when the end face 44 is only bearing against the compression area 24. The end face 44 subsequently reaches the stationary plate 30 and the outer core pin actuator 42 stops further movement of the outer core pin 26 toward the stationary plate 30. At this point, the hole 12 has been cut in the compression area 24 and the cut-out portion 23 of the compression area 24 is disposed between the concave portion of the end face 44 and the stationary plate 30. The outer core pin actuator 42 then moves the outer core pin 18 back to the initial position. Accordingly, the cut-out portion 23 of the compression area 24 is placed substantially back in the hole 12 from which it was removed. Thus, when the mold 16 is subsequently opened, the cut out portion 23 either can be easily removed from or will fall out of the hole 12.

Figure 3:
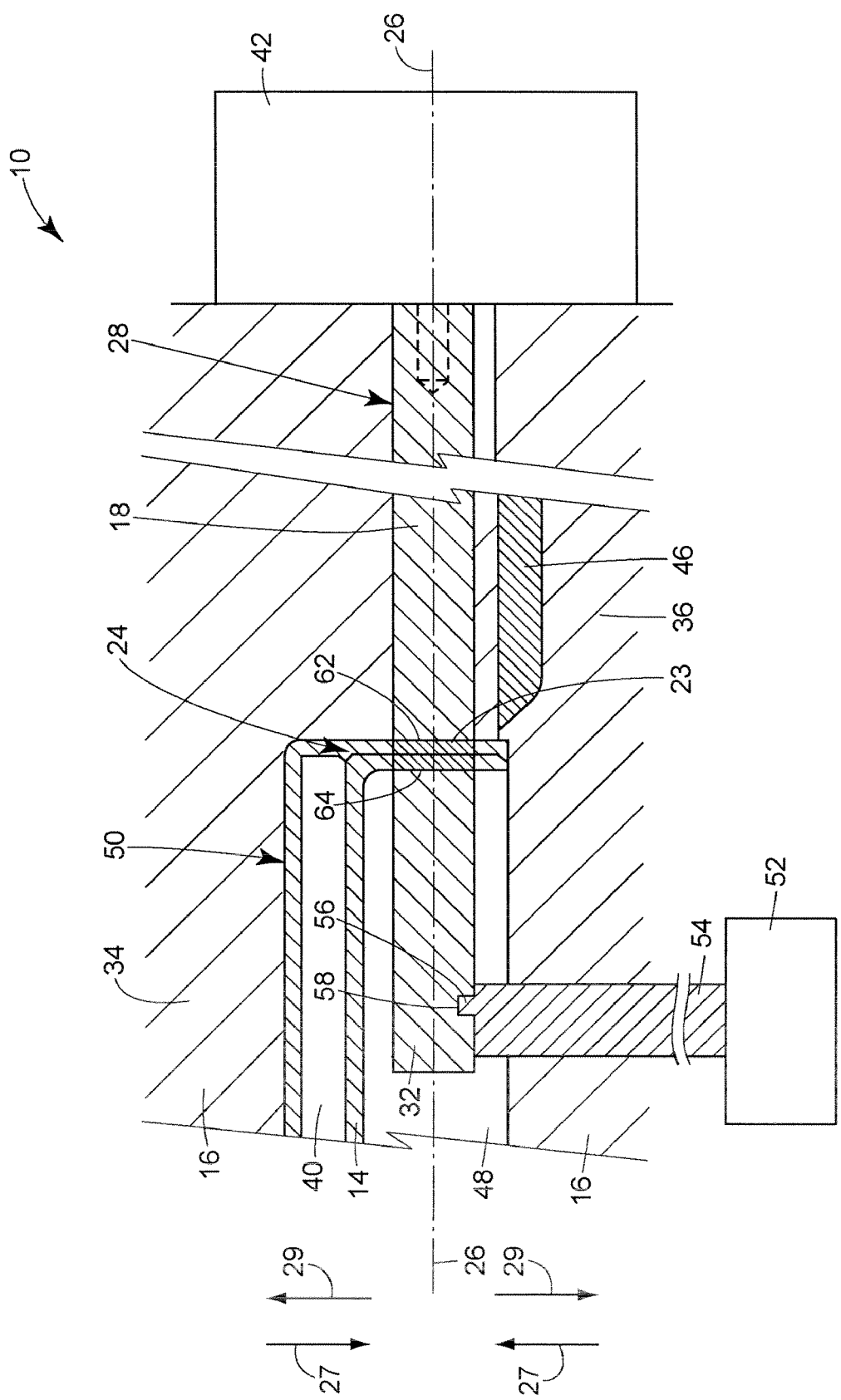
FIG. 3 is a cut-away view of a mold and a blow molding system in accordance with the teachings of a second example of the present disclosure, showing a blow molded article prior to a hole being formed therein.
Figure 4:
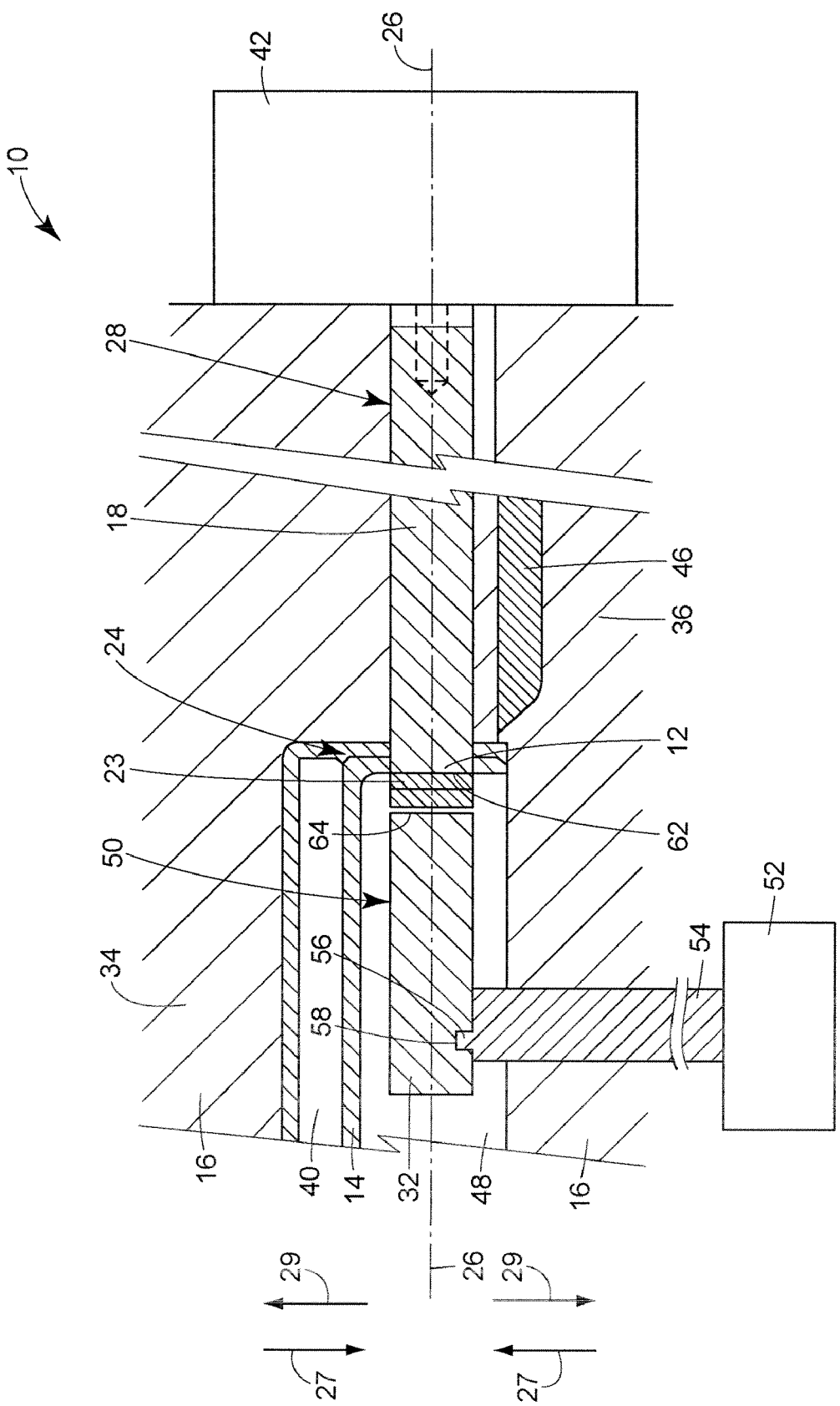
FIG. 4 is the cut-away view of the mold and the blow molding system of FIG. 3, showing the blow molded article after the hole has been formed therein.

Referring to FIGS. 3 and 4, in the second disclosed example, the pin support 20 includes the inner core pin 32 that moves with the outer core pin 18 in a reciprocating manner. The pin support 20 further includes an inner core pin housing 48 that is attached to either the first mold half 34 or the second mold half 36, which may depend on the shape and the configuration of the mold, and where on the blow molded article 14 the hole 12 is located. In the example shown in FIGS. 3 and 4, the inner core pin housing 48 is disposed between the blow molded article 14 and the second mold half 36. The inner core pin housing 48 includes an inner bore 50 for housing the inner core pin 32. The inner core pin 32 and the inner bore 50 have a common axis, which is the pin axis 26.

The inner core pin 32 moves inside the inner bore 50 in a reciprocating manner similar to the movement of the outer core pin 18 in the outer bore 28. To move the inner core pin 32 as such, an inner core pin actuator 52 is provided external to the mold 16 that is connected to the inner core pin 32. One of ordinary skill in the art will readily appreciate that the inner core pin actuator 52 can be any type of actuation device capable of providing a linear motion for the inner core pin 32 inside the inner bore 50. In the disclosed example, the inner core pin actuator 52 is a rotary actuator that rotates an actuation rod 54 that is connected to the inner core pin 32. An end of actuation rod 54 that connects to the inner core pin 32 includes a cam 56 that rotates in a corresponding slot 58 of the inner core pin 32. The cam and slot mechanism is well known to those of ordinary skill in the art and is commonly used in various fields of art. The rotation of the cam 56 inside the slot 58 converts the rotational motion of the actuation rod 54 to a translational motion of the inner core pin 32.

Figure 5:
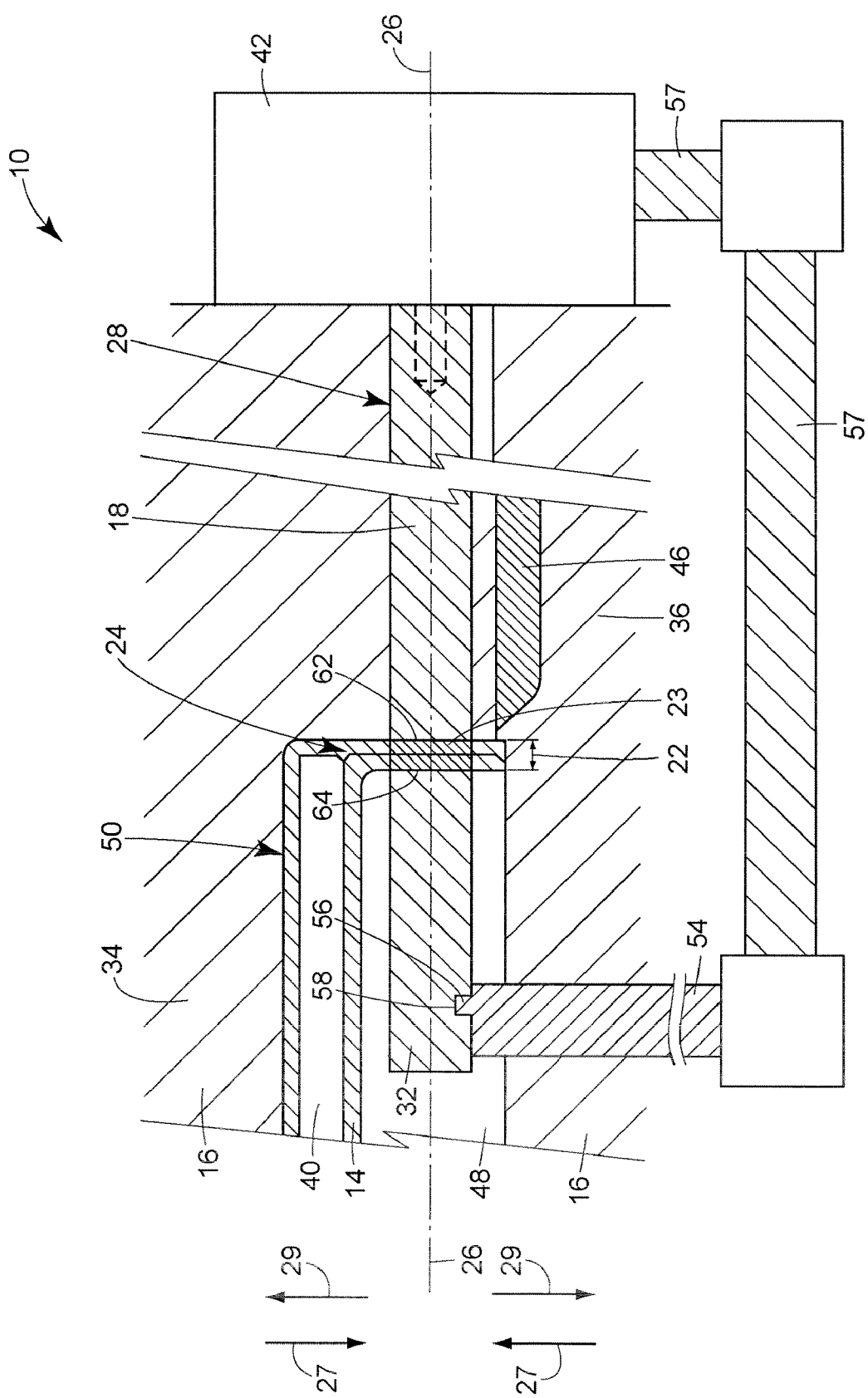
FIG. 5 is a cut-away view of the mold and the blow molding system of FIG. 3, showing an alternate teaching of the second example of the present disclosure.

The inner core pin 32 and the outer core pin 18 can also be moved in the reciprocating manner, as described in the foregoing, by only one actuator. For instance, the inner core pin 32 can be connected to the outer core pin 18 (not shown) by one or more linkages (not shown) that provide for the simultaneous and synchronous movement of the inner core pin 32 with the outer core pin 18. Alternately, as shown in FIG. 5, the inner core pin 32 can be connected to the outer core pin actuator 42 by one or more linkages 57 that provide for simultaneous and synchronous movement of the inner core pin 32 with the outer core pin 18.

In the second disclosed example, the outer core pin 30 includes a flat face 62 and the inner core pin includes a flat face 64, both of which partially define the boundaries of the gap 22. Accordingly, the flat faces 62 and 64 bear against the portion 23 of the compression area 24 when formed. After the compression area 24 is formed in the mold 16, the outer core pin actuator 42 moves the outer core pin 18 from the initial position toward the inner core pin 32. Simultaneously and synchronously, however, the inner core pin 32 moves with and in the same direction as the outer core pin 30. Accordingly, the portion 23 of the compression area 24 bound by the flat faces 62 and 64 is broken away or cut out of the compression area 24 by being moved in the direction of the movement of the inner core pin 32 and the outer core pin 30. At this point, the hole 12 has been formed in the compression area 24 and the cut-out portion 23 of the compression area 24 is disposed between the flat faces 62 and 64 of the outer core pin 30 and the inner core pin 32, respectively. Prior to the mold 16 being opened for removal of the blow molded article 14, the outer core pin actuator 42 and the inner core pin actuator 52 simultaneously and synchronously move the outer core pin 18 and the inner core pin 32, respectively, to the initial position. Accordingly, the cut-out portion 23 is placed substantially back in the hole 12. Thus, when the mold 16 is subsequently opened, the cut out portion 23 either can be removed or can simply fall from the blow molded article 14 to expose the hole 12.

In both disclosed examples, returning the outer core pin 18 to the initial position prior to opening the mold 16 may be necessary to provide release of the blow molded article from the mold 16. As shown in FIGS. 1–4, a portion of the outer core pin 18 will be inside the hole 12 immediately after cutting the portion 23 of the compression area 24. To remove the blow molded article 14 from the mold 16, the outer core pin 18 has to be removed from the hole 12 to free the blow molded article 14. Accordingly, as described in the foregoing two examples, the outer core pin 18 returns to the initial position to provide the release of the blow molded article 14 prior to the opening of the mold 16. Furthermore, as described in the foregoing, the movement of the outer core pin 18 to the initial position will generally place the cut-out portion 23 substantially back in the hole 12, so that when the mold 16 is opened, the cut-out portion 23 can be simple removed from the hole 12. Additionally, return of the outer core pin 18 to the initial position may not be necessary either if the mold 16 can be opened without doing so, or if the blow molded article 14 can be released from the mold 16 without the return of the outer core pin 18 to the initial position.

One of ordinary skill in the art will appreciate that the shape of the end face 44 of the outer core pin 18 in the first disclosed example, and the shapes of the flat faces 62 and 64 of the outer core pin 18 and the inner core pin 32 in the second disclosed example, respectively, will determine the shape of the hole 12 that will be cut out of the compression area 24. For instance, to provide a circular hole 12, the end face 44 must be circular, and the flat faces 62 and 64 must be circular. Thus, the hole 12 can be formed with any shape desired simply by changing the end face shape of the pins.

The disclosed blow molding system 10 and method can form a hole through a compression area of a blow molded article during the blow molding process. Furthermore, the disclose blow molding system 10 and method can form a hole that is generally transverse to the open and close directions of the mold. One of ordinary skill in the art will appreciate, however, that the disclosed blow molding system 10 and method can be adapted for any blow molding system and method for the purpose of forming a hole in a blow molded article, regardless of the orientation of the hole relative to the open and close direction of the mold.

Although certain apparatuses constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A system for forming a hole through a compression area of a blow molded article, the system comprising:
    a mold having at least a first mold part and a second mold part, the first and second mold parts adapted to move toward each other in a closing direction to close the mold and adapted to move apart in an opening direction to open the mold, the mold having a gap between the first mold part and the second mold part defining the compression area when the mold is closed;
    a moveable outer core pin;
    an outer bore disposed inside the mold and adapted to house the outer core pin therein, the outer bore and the outer core pin having a pin axis generally oriented transverse to the opening direction and the closing direction; and
    a pin support disposed inside the mold adjacent the outer bore along the pin axis;
    wherein an end face of the outer core pin and the pin support partially define boundaries of the gap;
    wherein the outer core pin moves toward and strikes the pin support along the pin axis to cut out a portion of the compression area during the blow molding process to provide a hole in the blow molded article; and
    wherein the end face of the outer core pin includes a sharp perimeter to cut the portion of the compression area when moving toward the pin support.

2. A mold for forming a hole through a compression area of a blow molded article comprising:
    an outer core pin moveably disposed in an outer bore and oriented along a pin axis, an end face of the outer core pin bearing against the compression area when formed in the mold; and
    an inner core pin moveably disposed in an inner bore and oriented along the pin axis, an end face of the inner core pin bearing against the compression area opposite the end face of the outer core pin;
    wherein the pin axis is oriented transverse to an open and close direction of the mold;
    wherein the outer core pin and the inner core pin move in a reciprocating manner along the pin axis to a remove a portion of the compression area bounded by the end face of the outer core pin and the end face of the inner core pin to form the hole in the compression area;
    an inner core pin actuator operatively coupled to the inner core pin and adapted to move the inner core pin in the inner bore; and wherein the inner core pin actuator comprises an actuation rod having a cam adapted to engage a corresponding slot in the inner core pin, wherein rotation of the actuation rod provides rotation of the cam in the slot to move the inner core pin in the inner bore.

* * * * *